United States Patent
Cheng

(10) Patent No.: US 7,457,209 B2
(45) Date of Patent: Nov. 25, 2008

(54) OPTICAL PICKUP CALIBRATING APPARATUS IN A DISC PLAYER AND A FABRICATION METHOD OF THE SAME

(75) Inventor: Atman Cheng, Taipei (TW)

(73) Assignee: Asustek Computer Inc., Taipei (TW)

( * ) Notice: Subject to any disclaimer, the term of this patent is extended or adjusted under 35 U.S.C. 154(b) by 661 days.

(21) Appl. No.: 11/194,584

(22) Filed: Aug. 2, 2005

(65) Prior Publication Data

US 2006/0028930 A1 Feb. 9, 2006

(30) Foreign Application Priority Data

Aug. 3, 2004 (TW) .............................. 93123252 A

(51) Int. Cl.
*G11B 7/00* (2006.01)
(52) U.S. Cl. .................. 369/44.32; 369/44.15
(58) Field of Classification Search .............. 369/44.32, 369/44.15, 44.16, 44.12
See application file for complete search history.

(56) References Cited

U.S. PATENT DOCUMENTS 7,054,236 B2 * 5/2006 Kawano ................... 369/44.16

FOREIGN PATENT DOCUMENTS

TW 440048 6/2001
TW 556940 10/2003

* cited by examiner

*Primary Examiner*—Nabil Z Hindi
(74) *Attorney, Agent, or Firm*—Birch, Stewart, Kolasch & Birch, LLP

(57) ABSTRACT

An optical pickup calibrating apparatus for calibrating the laser emitting direction of an optical pickup supported on a guiding rod is provided. The optical pickup calibrating apparatus has a base and a holder. The holder, which is pivotally assembled to the base, has a trench formed on a sidewall thereof and encircling the holder. The latitude of the trench is uneven. The guiding rod has a first end slidably assembled in the trench. The rotation of the holder results a motion of the first end perpendicular to the base for adjusting the tilt of the guiding rod.

18 Claims, 5 Drawing Sheets

OPTICAL PICKUP CALIBRATING APPARATUS IN A DISC PLAYER AND A FABRICATION METHOD OF THE SAME

BACKGROUND OF THE INVENTION (1) Field of the Invention

This invention relates to an optical pickup calibrating apparatus in a disc player and a fabricating method of the same, and more particularly to an apparatus in which a guiding rod supporting the optical pickup is calibrated up and down to have the optical pickup focusing on the surface of a disc.

(2) Description of Related Art

In a rapid progress of personal computer industry, computer peripheral products, such as hard disks, disc players, scanners, and printers, have been broadly used in modern offices. Among these peripheral products, the disc player using compact disc (CD) featuring an enormous storing capacity, various data formats acceptable, and long period data storage is a most popular choice. In addition, the development of digital versatile disc (DVD) with a storage capacity up to 17 Giga byte (GB) improves high quality video and audio applications for disc players.

Referring to FIG. 1, a traditional disc player has a spindle motor 10, an optical pickup 20, and a driving apparatus 30. A disc (not shown in this figure), such as CD or DVD, is loaded on the spindle motor 10 and rotated by the spindle motor 10. The driving apparatus 30 is utilized to position the optical pickup 20 for helping the optical pickup 20 proceeding precise tracking and focusing on the disc to access data.

The driving apparatus 30 has a guiding rod 32, a sled motor (not shown), and a guiding shaft 34. The guiding rod 32 and the guiding shaft 34 are substantially parallel with each other and extended from the location of the spindle motor 10. The opposite edges of the optical pickup 20 are supported on the guiding rod 32 and the guiding shaft 34, respectively. By starting the sled motor to rotate the guiding shaft 34, the optical pickup 20 is positioned along the guiding rod 32. That is, the tilt event of the guiding rod 32 and the guiding shaft 34 implies the laser emitting direction of the optical pickup 20.

There are a huge amount of optical pits formed on the disc for storing data. The laser emitting direction of the optical pickup 20 had better be perpendicular to the surface of the disc for accessing data correctly. However, some small errors in the laser emitting direction are unpreventable in the fabrication process, and may significantly affect the performance of the optical pickup 20. For calibrating such errors, an optical pickup calibrating apparatus is usually formed together in the disc player for precisely adjusting the laser emitting direction of the optical pickup 20 to promote the yield.

Referring to FIGS. 2A and 2B, the traditional optical pickup calibrating apparatus has a base 410, a holder 420, a curved elastic sheet 430, a first screw 440, a second screw 450, and an adjusting screw 460. The holder 420 is screw-fixed on the base 410 by using the first screw 440 to hold one of the both ends 32a of the guiding rod 32. The curved elastic sheet 430 is screw-fixed on the base 410 by using the second screw 450. The curve elastic sheet 430 has a free end applying forces on the guiding rod 32 to prevent the guiding rod 32 from vibrating. The adjusting screw 460 is assembled on the base 410 and has a portion protruding over the base 410 just below the guiding rod 32. By rotating the adjusting screw 460 to change the length of the protruding portion, the tilt of the guiding rod 32 can be calibrated.

As mentioned above, the traditional optical pickup calibrating apparatus includes six parts, the base 410, the holder 420, the curved elastic sheet 430, the first screw 440, the second screw 450, and the adjusting screw 460, incorporate to calibrate the tilt of the guiding rod 32. Some corresponded assembling steps to complete the optical pickup calibrating apparatus within the disc player are necessary. Since the mechanism of the optical pickup calibrating apparatus is quite complicated, the yield of the disc player will definitely decrease and some additional fabrication cost will be unpreventable.

Accordingly, how to simplify the mechanism of the optical pickup calibrating apparatus for increasing the reliability of the disc player and also reducing the fabrication cost has become important designing issues of disc players nowadays.

SUMMARY OF THE INVENTION

It is an object of the present invention to reduce the number of required parts within the optical pickup calibrating apparatus to lessen the fabrication cost.

An optical pickup calibrating apparatus is provided in the present invention for calibrating the laser emitting direction of an optical pickup supported on a guiding rod. The optical pickup calibrating apparatus has a base and a holder. The holder is assembled to the base and has a trench formed on a sidewall thereof. The trench encircles the holder and the latitude of the trench is uneven. The guiding rod has a first end slidably assembled in the trench. The rotation of the holder results a relative motion between the trench and the guiding rod for guiding the first end moving perpendicular to the base to adjust the tilt of the guiding rod.

A fabrication method of forming the optical pickup calibrating apparatus is also provided in the present invention. Firstly, providing a base with a through hole formed thereon. Subsequently, forming a holder encircling the though hole by using injecting molding. The sidewall of the holder having a trench formed thereon. The trench encircles the holder and the latitude of the trench is uneven. Then, assembling the first end of the guiding rod in the trench. Afterward, assembling the optical pickup on the guiding rod. Then, checking the laser emitting direction of the optical pickup. If some error exists, rotate the holder to result a relative motion between the trench and the guiding rod for guiding the first end moving perpendicular to the base to adjust the tilt of the guiding rod.

Reference will now be made in detail to the preferred embodiments of the present invention, examples of which are illustrated in the accompanying drawings. Wherever possible, the same reference numbers will be used throughout the drawings to refer to the same or like parts.

BRIEF DESCRIPTION OF THE DRAWINGS

The present invention will now be specified with reference to its preferred embodiment illustrated in the drawings, in which.

DETAIL DESCRIPTION OF THE PREFERRED EMBODIMENTS

Figure 3A:
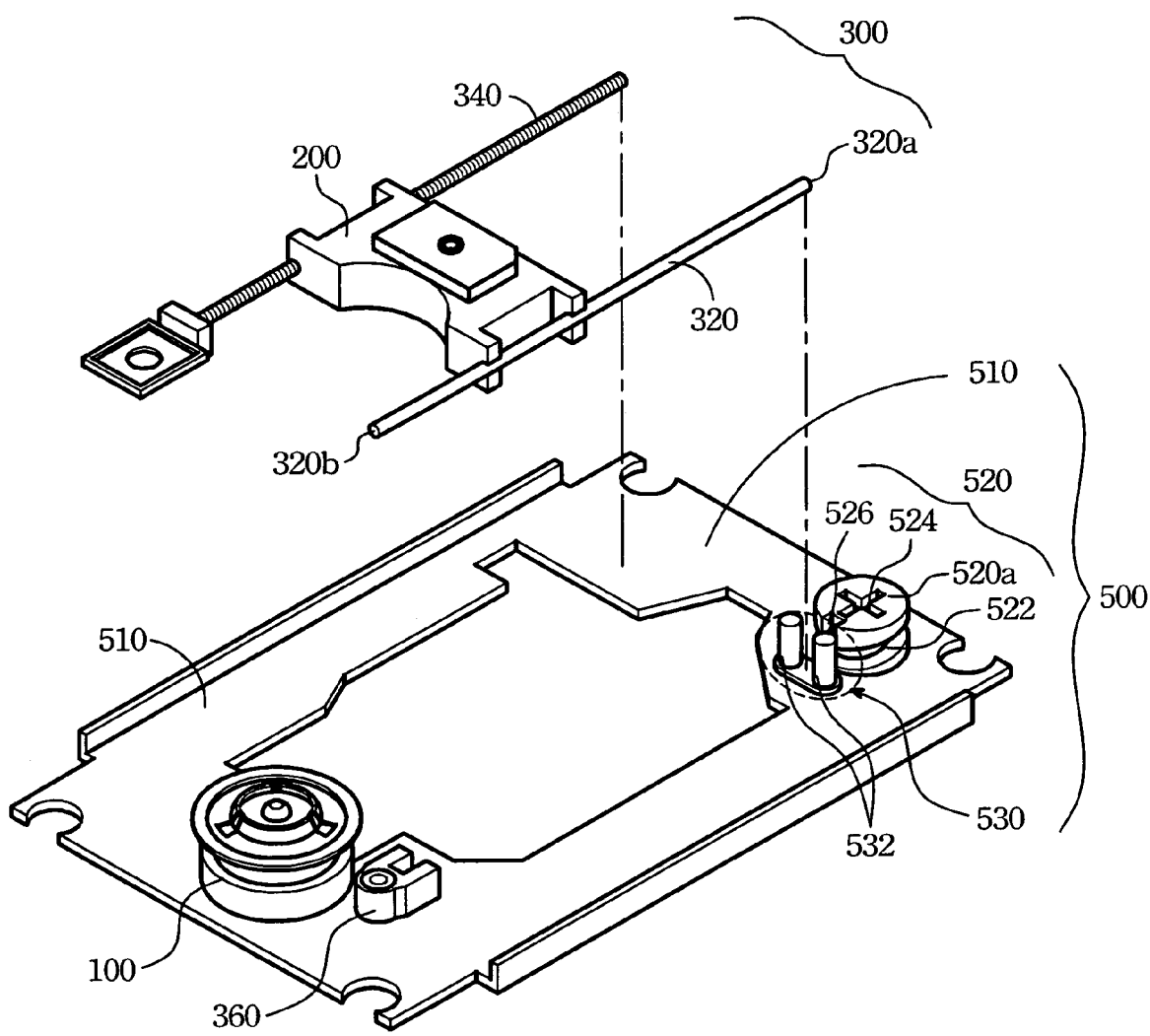
FIG. 3A depicts a schematic view of a preferred embodiment of a disc player in accordance with the present invention.

Referring to FIG. 3A, a disc player in accordance with the present invention has a spindle motor 100, an optical pickup 200, a driving apparatus 300, and an optical pickup calibrating apparatus 500. A disc (not shown in this figure), such as CD or DVD, is loaded on the spindle motor 100 and rotated by the spindle motor 100. The driving apparatus 300 includes a guiding rod 320, a sled motor (not shown), and a guiding shaft 340. The guiding rod 320 and the guiding shaft 340 are substantially parallel with each other and extended from the location of the spindle motor 100. The opposite edges of the optical pickup 200 are supported on the guiding rod 320 and the guiding shaft 340, respectively. By operating the sled motor to rotate the guiding shaft 340, the optical pickup 200 is positioned along the guiding rod 320.

After the spindle motor 100, the driving apparatus 300, the optical pickup 200 had been assembled in the disc player, the optical pickup calibrating apparatus 500 is utilized to calibrate the laser emitting direction of the optical pickup 200. The laser emitting direction of the optical pickup 200 must be parallel to the rotating axis of the spindle motor 100. Still referring to FIG. 3A, the optical pickup calibrating apparatus 500 in accordance with the present invention includes a base 510, a holder 520, and a positioning unit 530. The holder 520 is pivotally assembled to the base 510. The sidewall of the holder 510 has a trench 522 formed thereon. Also referring to FIG. 3B, a first end 320a of the guiding rod 320 is slidably assembled in the trench 522, which means that the first end 320a is partially fixed in the trench 522 and only able to move along the trench 522. A second end 320b of the guiding rod 320 is fixed in a bearing 360 placed on the base 510. The positioning unit 530 is formed on the base 510 in contact with the guiding rod 320 for restricting the extending direction of the guiding rod 320. The positioning unit 530 had better be close to the holder 520. In addition, as a preferred embodiment shown in FIG. 3A, for effectively restricting the extending direction of the guiding rod 320, the positioning unit 530 includes two rods 532 parallel with each other and leads to two opposing sides of the guiding rod 320.

Figure 3B:
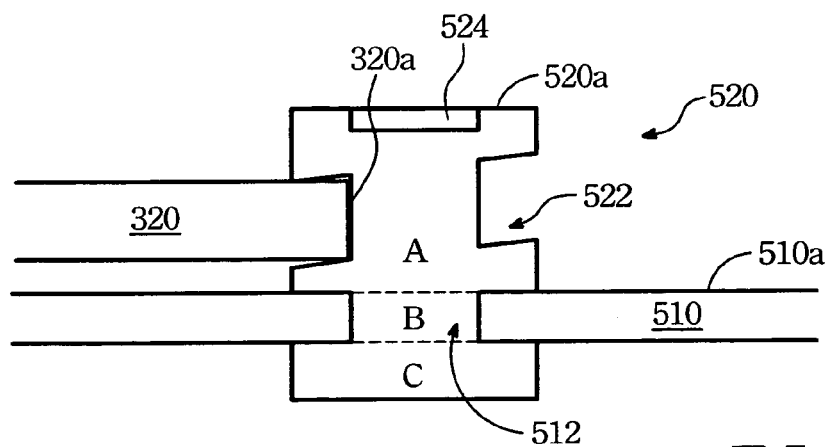
FIG. 3B is an enlarged cross-section view depicting the holder shown in FIG. 3A.

As shown in FIG. 3B, the holder 520 is roughly cylindrical in shape. The latitude of the trench 522 on the sidewall of the holder 520 with respect to an upper surface 510a of the base 510 is uneven. Thus, by rotating the holder 520 to guide the first end 320a of the guiding rod 320 moving along the trench 522, the first end 320a is forced to move perpendicular to the base 510 to tilt the guiding rod 320 for calibrating the laser emitting direction of the optical pickup 200. Moreover, a projection of the trench 522 on the base 510 may have two substantially common centered circles to make sure a good sliding event between the first end 320a of the guiding rod 320 and the trench 522. Furthermore, in a preferred embodiment, the trench 522 may be spirally encircling on the sidewall of the holder 520.

In order to facilitate the process of assembling the guiding rod 320 to the holder 520, as shown in FIG. 3A, the holder 520 has an opening 526 extending from the trench 522 to a top surface 520a thereof for guiding the first end 320a of the guiding rod 320 into the trench 522. In addition, a groove 524 is formed on the top surface 520a to facilitate a precise control over the rotation of the holder 520.

Also referring to FIG. 3B, which shows a cross-section view of the holder 520, the holder 520 can be divided into an upper portion A, a shaft portion B, and a lower portion C. The upper portion A, which has the trench 522 formed thereon, is located above the base 510. The shaft portion B is assembled inside a circular through hole 512 of the base 510. The lower portion C is located below the base 510. It should be noted that the width of the upper portion A and the lower portion C must be bigger than the diameter of the circular through hole 512 to keep the holder 520 in place and prevent the holder 520 showing any unwanted movements with respect to the base 510, or even separating from the base 510.

Since the optical pickup 200 is supported on the guiding rod 320, certainly, the error in the laser emitting direction of the optical pickup 200 can be calibrated by adjusting the tilt of the guiding rod 320. Furthermore, because the spindle motor 100, which decides the surface direction of the disc, is assembled to the base 510, the base 510 may be regarded as a basic surface of the optical pickup calibrating apparatus in the present invention.

Figure 4A:
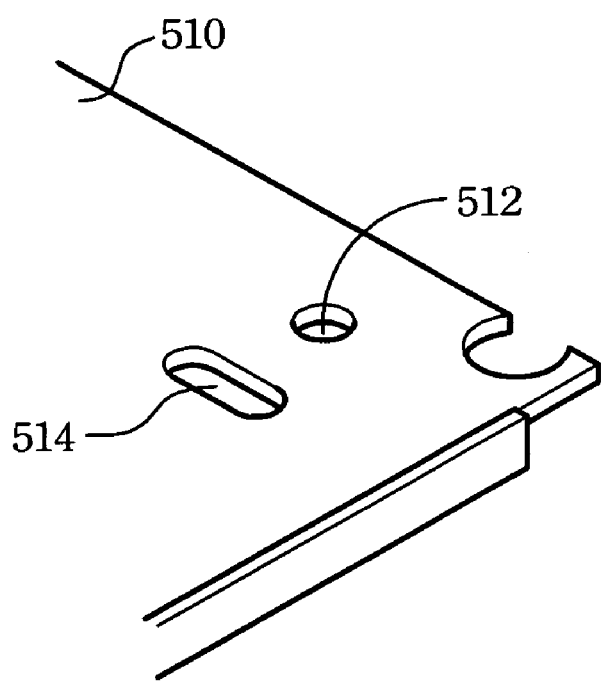
FIGS. 4A to 4C depict schematic views of a preferred embodiment of a fabrication method to form the optical pickup calibrating apparatus shown in FIG. 3A.
Figure 4B:
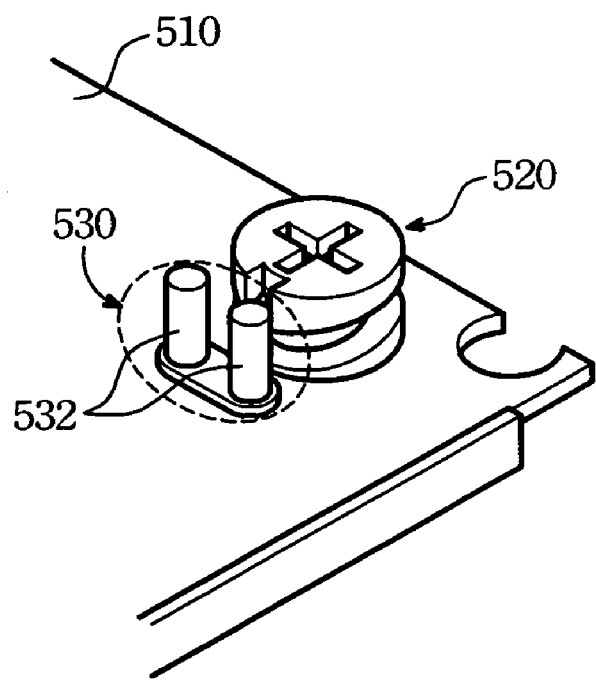
Figure 4C:
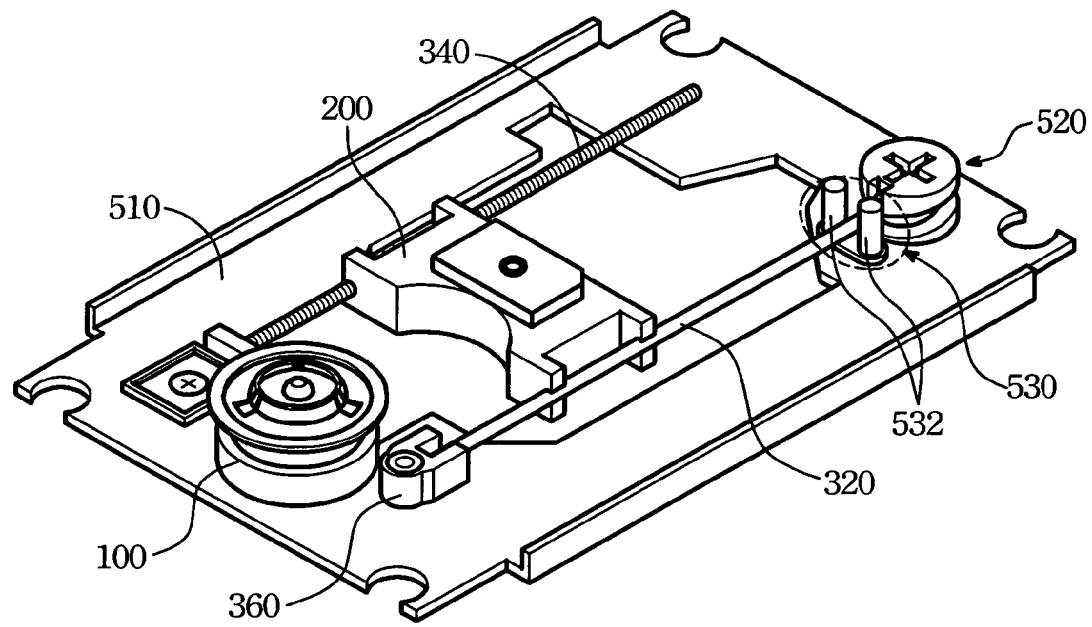

FIGS. 4A to 4C show a preferred embodiment of a fabrication method to form the optical pickup calibrating apparatus in accordance with present invention. Firstly, referring FIG. 4A, a circular through hole 512 and a concave 514 are formed on the base 510. Then, referring to FIG. 4B, by using the fabrication method of injecting molding attending with a properly designed injecting mold, the holder 520 as shown in FIG. 3A is formed to cover and fill the through hole 512. It is also noted that the resulted holder 520 is pivotally assembled to the base 510. In addition, the positioning unit 530 is simultaneously formed on the concave 514 and partially engaged and fixed in the concave 514. The above mentioned injecting molding process is carried out by injecting molten resin, such as the heated thermalplastic resin, into the mold. The molten resin is hardened as it is cooled off. In order to make sure that the holder 520 is pivotally assembled in the through hole 512, as a preferred embodiment, the base 510 may be composed of metal to prevent the holder 520 sticking on the base 510 and provide a better strength to prevent unwanted deformation. Afterward, referring to FIG. 4C, the first end 320a of the guiding rod 320 is assembled in the trench 522 through the opening 526 on the holder 520. Then, the optical pickup 200 is assembled on the guiding rod 320 to finish the fabrication process of the optical pickup calibrating apparatus in the present invention.

Figure 4D:
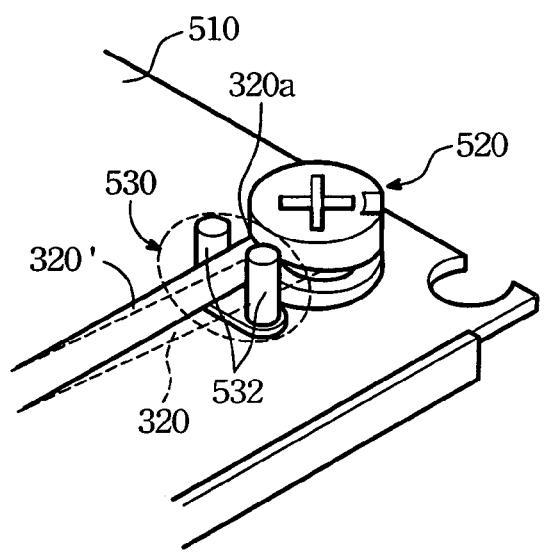
FIG. 4D depict a schematic view of a preferred embodiment to calibrate the tilt of the guiding rod by rotating the holder in accordance with the present invention.

Basically, the laser emitting direction of the optical pickup 200 of the disc player must be checked before the disc player is sold. As some errors in the laser emitting direction of the optical pickup 200 exist, as shown in FIG. 4D, the level of the first end 320a of the guiding rod 320 can be adjusted by rotating the holder 520 to change the tilt of the guiding rod 320 (an adjusted guiding rod 320' is shown in this figure) to calibrate the laser emitting direction of the optical pickup 200.

Figure 1:
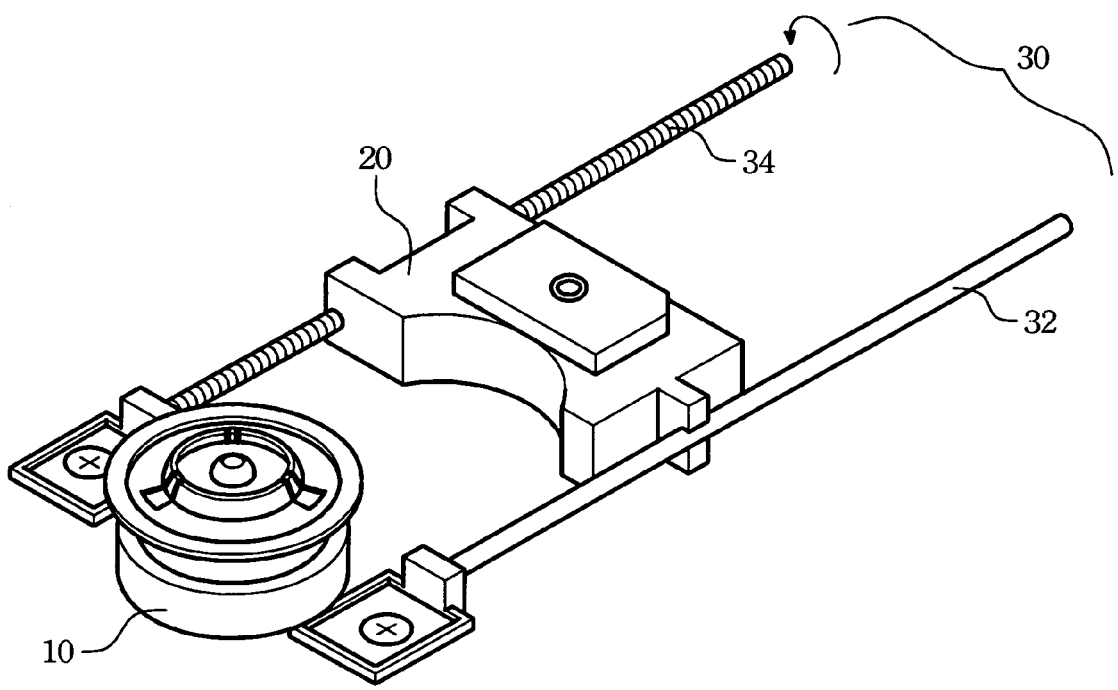
FIG. 1 depicts a schematic view of a traditional disc player.
Figure 2A:
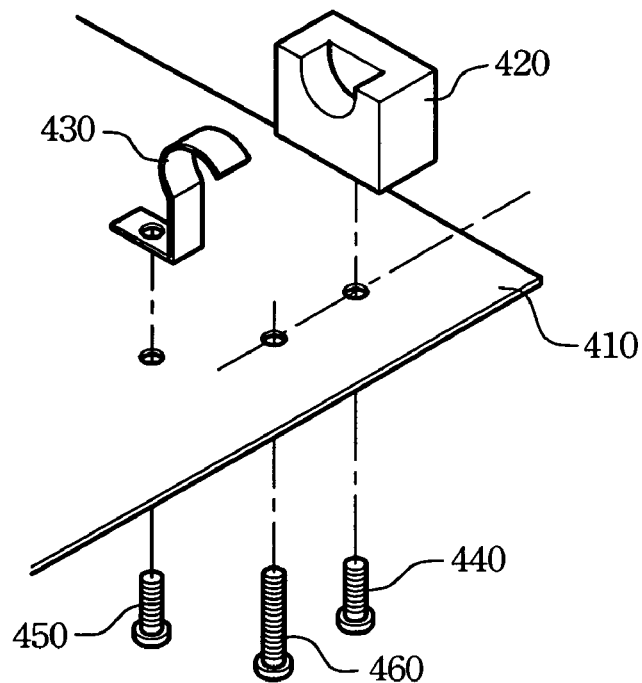
FIG. 2 depicts a schematic view of a tradition optical pickup calibrating apparatus.
Figure 2B:
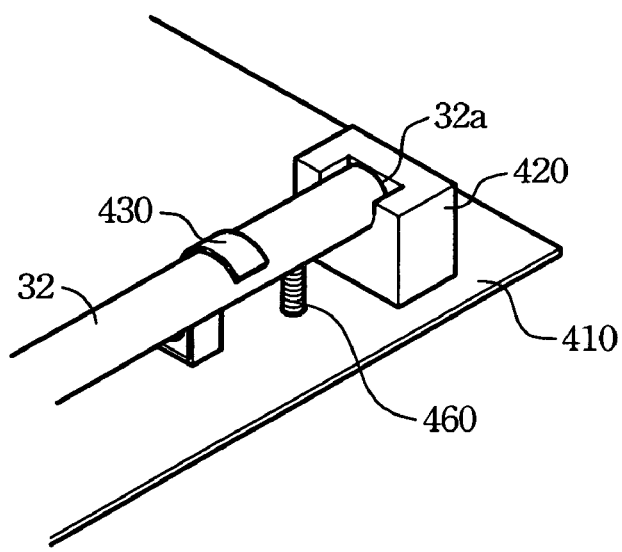

By contrast with the traditional optical pickup calibrating apparatus, the optical pickup calibrating apparatus 500 in accordance with the present invention has the following advantages:

Firstly, referring to FIGS. 2A and 2B, the traditional optical pickup calibrating apparatus needs a holder 420, a curved elastic sheet 430, a first screw 440, a second screw 450, and an adjusting screw 460. Whereas, the optical pickup calibrating apparatus 500 in the present invention only needs a holder 520 and a positioning unit 530 to calibrate the tilt of the guiding rod 320. Therefore, the fabrication cost is significantly reduced.

Secondly, it is understood that the simpler the mechanism, the better the reliability. Therefore, the optical pickup calibrating apparatus 500 in the present invention can promote the reliability and the yield of the disc player.

With the example and explanations above, the features and spirits of the invention will be hopefully well described.

Those skilled in the art will readily observe that numerous modifications and alterations of the device may be made when retaining the teaching of the invention. Accordingly, the above disclosure should be construed as limited only by the metes and bounds of the appended claims.

What is claimed is:

1. An optical pickup calibrating apparatus in a disc player for calibrating a laser emitting direction of an optical pickup supported on a guiding rod, the optical pickup calibrating apparatus comprising:
    a base; and
    a holder, assembled to the base, having a trench formed on a sidewall of the holder encircling the holder, and a latitude of the trench with respect to the base is uneven;
    wherein the guiding rod having a first end slidably assembled in the trench, a rotation of the holder resulting a relative motion between the trench and the guiding rod for guiding the first end moving perpendicular to the base to adjust the tilt of the guiding rod.

2. The optical pickup calibrating apparatus of claim 1, wherein the base is composed of metal and the holder is composed of thermalplastic resin.

3. The optical pickup calibrating apparatus of claim 1, wherein the projection of the trench on the base forms two substantially common-centered circles.

4. The optical pickup calibrating apparatus of claim 1, wherein the trench is spirally encircling on the sidewall of the holder.

5. The optical pickup calibrating apparatus of claim 1, further comprising a positioning unit on the base in contact with the guiding rod to restrict the extending direction thereof.

6. The optical pickup calibrating apparatus of claim 5, wherein the positioning unit comprising two rods parallel with each other leading to two opposing sides of the guiding rod.

7. The optical pickup calibrating apparatus of claim 1, wherein the holder has an opening extending from the trench to a top surface of the holder for guiding the first end of the guiding rod assembled in the trench.

8. The optical pickup calibrating apparatus of claim 1, wherein the base has a through hole, and the holder is pivotally assembled in the through hole.

9. The optical pickup calibrating apparatus of claim 8, wherein the holder has an upper portion, a shaft portion, and a lower portion, the upper portion is located on the base, the shaft portion is assembled inside the through hole, the lower portion is located below the base, and the width of the upper portion and the lower portion is bigger than the diameter of the through hole to prevent the holder separating from the base.

10. A disc player, comprising:
    a base;
    a spindle motor, positioned on the base for rotating a disc;
    a holder, pivotally assembled to the base, having a trench formed on a sidewall of the holder encircling the holder, and a latitude of the trench with respect to the base is uneven;
    a guiding rod, assembled on the base and having a first end slidably assembled in the trench; and
    an optical pickup, supported by the guiding rod for reading the data on the disc;
    wherein a rotation of the holder results a relative motion between the trench and the guiding rod for guiding the first end moving perpendicular to the base to adjust the tilt of the guiding rod.

11. The disc player of claim 10, wherein the base is composed of metal and the holder is composed of thermalplastic resin.

12. The disc player of claim 10, wherein the projection of the trench on the base has two substantially common-centered circles.

13. The disc player of claim 10, wherein the trench is spirally encircling on the sidewall of the holder.

14. The disc player of claim 10, further comprising a positioning unit on the base in contact with the guiding rod to restrict the extending direction thereof.

15. The disc player of claim 14, wherein the positioning unit comprising two rods parallel with each other leading to two opposing sides of the guiding rod.

16. The disc player of claim 10, wherein the holder has an opening extending from the trench to a top surface of the holder for guiding the first end of the guiding rod assembled in the trench.

17. The disc player of claim 10, wherein the base has a through hole, and the holder is pivotally assembled in the through hole.

18. The disc player of claim 17, wherein the holder has an upper portion, a shaft portion, and a lower portion, the upper portion is located on the base, the shaft portion is assembled inside the through hole, the lower portion is located below the base, and the width of the upper portion and the lower portion is bigger than the diameter of the through hole to prevent the holder separating from the base.

* * * * *